United States Patent [19]
Borchmann et al.

[15] 3,689,619
[45] Sept. 5, 1972

[54] CONTINUOUS GRANULATION OF TRIOXANE

[72] Inventors: Joern Borchmann, 19 Woehlerstrasse; Hugo Fuchs, 165 Sternstrasse; Gert Goeschel, 7 an der Froschlache; Bruno Sander, 10 Moerikestrasse; Heinrich Sperber, 158 Mundenheimer Strasse, all of 6700 Ludwigshafen, Germany

[22] Filed: April 3, 1970

[21] Appl. No.: 25,561

[30] Foreign Application Priority Data

April 5, 1969 Germany..........P 19 17 647.7

[52] U.S. Cl. ................................................ 264/144
[51] Int. Cl. ................................................. B01j 2/12
[58] Field of Search......................264/140, 115, 144

[56] References Cited

UNITED STATES PATENTS 2,697,249  12/1954  Bettes, Jr. et al. ..........264/115

FOREIGN PATENTS OR APPLICATIONS 731,203  3/1966  Canada..........................264/5

OTHER PUBLICATIONS

Buflovak Flakers, Blaw–Knox Co., Catalog 370 pages 1, 9, 1964.

*Primary Examiner*—Robert F. White
*Assistant Examiner*—J. R. Hall
*Attorney*—Johnston, Root, O'Keeffe, Keil, Thompson & Shurtleff

[57] ABSTRACT

Method of granulating trioxane in which molten trioxane containing small quantities of water is contacted with a cold surface.

4 Claims, No Drawings

CONTINUOUS GRANULATION OF TRIOXANE

It is known that substances which form plastics and soft crystals or which possess a high vapor pressure are difficult to granulate because the products tend to stick to the usual machines or re-agglomerate.

If, for example, the crystallization of trioxane is attempted on a drum flaker in accordance with the proposal made in Dutch Pat. application No. 6,714,150, the result is not usually a flaked product or a free-flowing product of some other shape, but instead there are formed ribbons or sheet-like pieces of various thicknesses and widths, which are difficult to convert to a free-flowing product.

German Pat. specification No. 1,166,212, however, discloses a method of granulating trioxane in which molten trioxane is charged into a tank with walls of polyolefin and allowed to solidify while the tank is suitably agitated.

Although this method of granulating trioxane in tanks with walls of polyolefin may produce pure granular trioxane, it is time-consuming and laborious due to the poor heat transfer through the polyolefin walls, and we have found that good results may only be obtained by charging the crystallization tank with only relatively small quantities of molten trioxane.

We have now found that it is possible to produce solid, free-flowing trioxane of adequate purity for most purposes by a simple and conventional method of crystallization by contacting molten trioxane with a cold body and scraping the deposited crystalline solid material from the surface of the body, provided that a small quantity of water is added to the trioxane before, during or after contacting.

The amount of water added may range from, say, 10 to 5,000 ppm and in particular from 10 to 1,000 ppm based on the weight of the molten material. Advantageously, from 30 to 150 ppm of water is used. It will be appreciated that the water may also contain such other materials as are usually added to trioxane, such as antioxidants and stabilizers (phenols, amines, amino alcohols, etc.). However, such additives may alternatively be added to the trioxane beforehand. A suitable cold body or crystallizing machine is, in particular, a device known as a drum flaker. A rotary tube with cooled walls and fixed or counter-rotary internal scrapers is also very suitable. The usual modifications of such devices are also suitable, as for example twin drums. The water is conveniently applied to the surface of the molten trioxane. Alternatively, it may be applied to the metal surface of the cold body or added to the trioxane beforehand.

The temperature of the cooling water or that of the surface of the cold body may be from 5° to 50°C, preferably from 15° to 30°C. It is beneficial to operate under an atmosphere of an inert gas, such as nitrogen, since trioxane is known to be susceptible to oxygen. The advantage of the present method over previously known methods is that large quantities of trioxane may be granulated in a short time at low expense and without appreciable losses. The quantities of water added in the present method are hardly significant, even for critical applications of trioxane, and surprisingly, substantially less water is found in the resulting crystals than was originally added, which leads to the assumption that a large proportion of the added water evaporates during the crystallization process.

The method may be conveniently carried out as follows:

Molten trioxane is continuously passed through a heated feed pipe to the trough of a cooled drum flaker, the drum being simultaneously rotated. Water is dripped continuously on to the surface of the trioxane in the trough at the desired rate concurrently with the trioxane feed. Alternatively, the water may be previously added to the trioxane, for example in a stirred vessel, and the water-containing trioxane fed to, say, twin drums. The surface of the drum or drums may be at a temperature of from 5° to 50°C, preferably from 15° to 30°C. It is beneficial to fill the drum chamber with an inert gas such as, in particular, nitrogen. There are practically no trioxane losses. If necessary, small amounts of antioxidants or stabilizers may also be added to the trioxane to prevent oxidation thereof. Suitable additives of this kind are phenols, amines, amino alcohols, etc.

Small flake-shaped trioxane crystals, about 0.3 to 5 mm in size, are produced at the scrapers bearing against the drum, and these crystals may be readily filled into sacks, drums or bins, from which they may be readily removed when required.

EXAMPLE 1

160 kg/h of molten trioxane is pumped through a heated feed-pipe to the through of a cooled drum. The latter has a width of 1,200 mm and a diameter of 600 mm. When the through is full, the drum is rotated at a speed of 4 r.p.m. At the same time, 25 g/h of water is dripped on to the surface of the trioxane in the trough via a fine-scale burette.

The temperature of the cooling water entering the drum is 15°C and that of the expended cooling water emerging from the drum is 18°C. The drum is enveloped in nitrogen.

The product scraped off by the scrapers is in the form of flakes having a mean size of from 2 to 5 mm. The yield is about 159 kg/h of trioxane having a water content of about 50 ppm, as determined titrimetrically by the method of Karl Fischer.

EXAMPLE 2

90 kg of molten trioxane is stirred at a temperature of 70°C and 9 g of distilled water is added. The mixture is forced out of the heated tank by nitrogen pressure and passes through a heated pipe to the nip of the twin-drum machine. The drums are cooled by water entering at a temperature of 18°C. With the nip set at 0.1 mm (under no-load conditions) and the drums set to rotate at a speed of 6 r.p.m. there are produced at the scrapers fine needle-shaped trioxane flakes having a thickness of from 0.2 to 0.4 mm. The output of the twin drums is 70 kg/hr of solid material at a drum width of 500 mm and a diameter of 300 mm.

We claim:

1. A method of producing solid, free-flowing trioxane by applying molten trioxane to the surface of a rotating drum kept at a temperature of from 5° to 50°C., allowing the trioxane applied to the drum surface to crystallize, adding a small quantity of at least 10 ppm of water to the molten trioxane before application of the molten trioxane to the drum surface, and then scraping it off from said surface in the form of small, free flowing granules of crystallized trioxane having sizes of about 0.3 to 5 mm.

2. A method as claimed in claim 1 wherein the quantity of water added to the molten trioxane is 10 to 5,000 ppm by weight, based on the trioxane.

3. A method as claimed in claim 1 wherein the quantity of water added to the molten trioxane is 10 to 1,000 ppm by weight, based on the trioxane.

4. A method as claimed in claim 1 wherein the quantity of water added to the molten trioxane is 30 to 150 ppm by weight, based on the trioxane.

* * * * *